United States Patent
Ryu et al.

(10) Patent No.: US 8,855,856 B2
(45) Date of Patent: Oct. 7, 2014

(54) VEHICLE ROLL CONTROL METHOD USING CONTROLLABLE FRICTION FORCE OF MR DAMPERS

(75) Inventors: Jihan Ryu, Rochester Hills, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2164 days.

(21) Appl. No.: 11/843,318

(22) Filed: Aug. 22, 2007

(65) Prior Publication Data

US 2008/0281488 A1 Nov. 13, 2008

Related U.S. Application Data

(60) Provisional application No. 60/916,686, filed on May 8, 2007.

(51) Int. Cl.
*B60G 17/00* (2006.01)
*B60G 17/018* (2006.01)
*B60G 17/016* (2006.01)

(52) U.S. Cl.
CPC ...... *B60G 17/0162* (2013.01); *B60G 2400/104* (2013.01); *B60G 2800/9122* (2013.01); *B60G 2500/102* (2013.01); *B60G 2800/012* (2013.01); *B60G 17/0182* (2013.01); *B60G 2400/204* (2013.01); *B60G 2600/02* (2013.01); *B60G 2400/41* (2013.01); *B60G 2600/17* (2013.01); *B60G 2202/23* (2013.01); *B60G 17/016* (2013.01); *B60G 2600/18* (2013.01)
USPC .................. 701/37; 701/36; 701/38; 280/5.5; 280/5.502; 280/5.506; 280/5.51; 280/5.512; 280/5.515; 280/5.519

(58) Field of Classification Search
None
See application file for complete search history.

(56) References Cited

U.S. PATENT DOCUMENTS

| | | | | |
|---|---|---|---|---|
| 5,277,281 A * | 1/1994 | Carlson et al. | ................. | 188/267 |
| 5,346,242 A * | 9/1994 | Karnopp | .................... | 280/5.514 |
| 5,390,121 A * | 2/1995 | Wolfe | ............................. | 701/37 |
| 6,035,253 A * | 3/2000 | Hayashi et al. | ............... | 701/428 |
| 6,097,393 A * | 8/2000 | Prouty et al. | .................. | 345/419 |
| 6,182,010 B1 * | 1/2001 | Berstis | .......................... | 701/441 |
| 6,335,754 B1 * | 1/2002 | Endo et al. | ....................... | 348/37 |
| 6,419,058 B1 * | 7/2002 | Oliver et al. | ............... | 188/267.2 |
| 6,438,464 B1 * | 8/2002 | Woywod et al. | .................. | 701/1 |
| 6,450,304 B1 * | 9/2002 | Miller et al. | ............... | 188/266.5 |
| 6,580,441 B2 * | 6/2003 | Schileru-Key | ................ | 715/805 |
| 6,697,726 B2 * | 2/2004 | Takagi et al. | ................... | 701/70 |
| 6,789,002 B1 * | 9/2004 | Hac et al. | .......................... | 701/1 |
| 6,906,643 B2 * | 6/2005 | Samadani et al. | ........ | 340/995.18 |
| 6,948,707 B2 * | 9/2005 | Gradu | .......................... | 267/191 |
| 6,953,108 B2 * | 10/2005 | Anderfaas et al. | .......... | 188/267.2 |
| 6,956,590 B1 * | 10/2005 | Barton et al. | .................. | 345/684 |
| 7,007,228 B1 * | 2/2006 | Carro | ........................... | 715/210 |
| 7,170,518 B1 * | 1/2007 | Millington et al. | ........... | 345/428 |

(Continued)

*Primary Examiner* — Jonathan M Dager
(74) *Attorney, Agent, or Firm* — John A. Miller; Miller IP Group, PLC

(57) ABSTRACT

A system for providing vehicle roll control that controls the friction-force of dampers provided at the wheels of the vehicle. The system includes a lateral acceleration sensor for determining the lateral acceleration of the vehicle, a steering angle sensor for determining the steering angle of the vehicle and a speed sensor for determining the speed of the vehicle. The system calculates a current control signal for one or more of the dampers based on the lateral acceleration and/or the steering angle, and uses one or both of the current control signals to control the friction-force of the inside, outside or both of the dampers.

12 Claims, 4 Drawing Sheets

(56) References Cited

U.S. PATENT DOCUMENTS

| | | | |
|---|---|---|---|
| 7,207,574 B2* | 4/2007 | Gradu et al. | 280/5.511 |
| 7,298,378 B1* | 11/2007 | Hagenbuch et al. | 345/589 |
| 7,321,816 B2* | 1/2008 | Lauwerys et al. | 701/37 |
| 7,411,594 B2* | 8/2008 | Endo et al. | 345/633 |
| 7,460,953 B2* | 12/2008 | Herbst et al. | 701/438 |
| 7,467,356 B2* | 12/2008 | Gettman et al. | 715/850 |
| 7,483,775 B2* | 1/2009 | Karaba et al. | 701/37 |
| 7,493,199 B2* | 2/2009 | Green | 701/38 |
| 7,518,636 B2* | 4/2009 | Endo et al. | 348/208.99 |
| 7,539,572 B2* | 5/2009 | Kamikawa et al. | 701/436 |
| 7,813,853 B2* | 10/2010 | Tomida | 701/37 |
| 8,009,178 B2* | 8/2011 | Chen et al. | 345/629 |
| 8,154,599 B2* | 4/2012 | Aoki et al. | 348/159 |
| 2001/0034661 A1* | 10/2001 | Ferreira | 705/26 |
| 2001/0037305 A1* | 11/2001 | Mochizuki | 705/52 |
| 2002/0047895 A1* | 4/2002 | Bernardo et al. | 348/48 |
| 2002/0070981 A1* | 6/2002 | Kida | 345/833 |
| 2002/0128760 A1* | 9/2002 | Bodie et al. | 701/37 |
| 2002/0133277 A1* | 9/2002 | Koh | 701/37 |
| 2002/0145620 A1* | 10/2002 | Smith et al. | 345/712 |
| 2002/0163547 A1* | 11/2002 | Abramson et al. | 345/855 |
| 2003/0007668 A1* | 1/2003 | Kotake et al. | 382/113 |
| 2003/0016228 A1* | 1/2003 | Youngblood et al. | 345/582 |
| 2003/0060971 A1* | 3/2003 | Millington et al. | 701/206 |
| 2003/0063133 A1* | 4/2003 | Foote et al. | 345/850 |
| 2003/0065430 A1* | 4/2003 | Lu et al. | 701/45 |
| 2003/0065446 A1* | 4/2003 | Ootomo et al. | 702/5 |
| 2003/0107569 A1* | 6/2003 | Endo et al. | 345/419 |
| 2003/0182052 A1* | 9/2003 | DeLorme et al. | 701/201 |
| 2004/0004659 A1* | 1/2004 | Foote et al. | 348/36 |
| 2004/0078813 A1* | 4/2004 | Kobuya et al. | 725/46 |
| 2004/0119759 A1* | 6/2004 | Barros | 345/853 |
| 2004/0174386 A1* | 9/2004 | Kotake et al. | 345/633 |
| 2004/0249565 A1* | 12/2004 | Park | 701/200 |
| 2005/0086612 A1* | 4/2005 | Gettman et al. | 715/848 |
| 2005/0099494 A1* | 5/2005 | Deng et al. | 348/36 |
| 2005/0121269 A1* | 6/2005 | Namuduri | 188/267.1 |
| 2005/0132305 A1* | 6/2005 | Guichard et al. | 715/855 |
| 2005/0192025 A1* | 9/2005 | Kaplan | 455/456.1 |
| 2005/0207672 A1* | 9/2005 | Bernardo et al. | 382/284 |
| 2005/0216186 A1* | 9/2005 | Dorfman et al. | 701/207 |
| 2005/0253350 A1* | 11/2005 | Suchta et al. | 280/124.106 |
| 2005/0268254 A1* | 12/2005 | Abramson et al. | 715/855 |
| 2006/0004512 A1* | 1/2006 | Herbst et al. | 701/208 |
| 2006/0031786 A1* | 2/2006 | Hillis et al. | 715/863 |
| 2006/0037990 A1* | 2/2006 | Geise | 228/101 |
| 2006/0089792 A1* | 4/2006 | Manber et al. | 701/207 |
| 2007/0045068 A1* | 3/2007 | Namuduri et al. | 188/267 |
| 2007/0118260 A1* | 5/2007 | Gade | 701/37 |
| 2007/0136259 A1* | 6/2007 | Dorfman et al. | 707/3 |
| 2007/0143676 A1* | 6/2007 | Chen | 715/700 |
| 2008/0040000 A1* | 2/2008 | Chen et al. | 701/38 |
| 2008/0189130 A1* | 8/2008 | Dorfman et al. | 705/1 |
| 2008/0195314 A1* | 8/2008 | Green | 701/211 |
| 2010/0088017 A1* | 4/2010 | Ujino | 701/201 |

* cited by examiner

VEHICLE ROLL CONTROL METHOD USING CONTROLLABLE FRICTION FORCE OF MR DAMPERS

CROSS-REFERENCE TO RELATED APPLICATIONS

This application claims the benefit of the priority date of U.S. Provisional Patent Application No. 60/916,686, titled Vehicle Roll Control Method Using Controllable Friction Force or MR Dampers, filed May 8, 2007.

BACKGROUND OF THE INVENTION

1. Field of the Invention

This invention relates generally to a system for reducing vehicle roll and, more particularly, to a system for reducing vehicle roll by controlling the friction-force of a damper at one or more of the wheels of the vehicle.

2. Discussion of the Related Art

Various vehicle control systems are known in the art that improve driver convenience, safety and comfort. One of the areas of control for vehicle control systems is the roll motion of the vehicle.

The centrifugal force on the body of a vehicle induces a vehicle roll during cornering. This vehicle roll may cause driver and passenger discomfort, vehicle instability and possibly even vehicle rollover. To prevent these adverse effects, vehicle roll may be reduced using an active or semi-active roll control system. However, known active vehicle roll control systems typically require a hydraulic system that increases system complexity and cost. A passive anti-roll bar can be used to reduce vehicle roll without a complex hydraulic system, but such an anti-roll bar tends to increase the suspension harshness by transmitting road disturbances, such as from a single wheel pothole or bump.

An attempt to overcome some of the drawbacks discussed above is provided by U.S. Patent Publication No. 2005/0253350, titled Roll Control System, Device and Method for Controlling Vehicle Stability. The system disclosed in this publication uses magnetorheological actuators to engage anti-roll bars to control the roll motion of the vehicle only when needed. However, this system still requires additional actuators to control the anti-roll bars, which also acts to increase system complexity and cost.

SUMMARY OF THE INVENTION

In accordance with the teachings of the present invention, a system for providing vehicle roll control is disclosed that controls the friction-force of dampers provided at the wheels of the vehicle. The system includes a lateral acceleration sensor for determining the lateral acceleration of the vehicle, a steering angle sensor for determining the steering angle of the vehicle and a speed sensor for determining the speed of the vehicle. The system calculates a current control signal for the dampers based on the lateral acceleration and/or the steering angle, and uses one or both of the current control signals to control the friction-force of the inside, outside or both of the dampers.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for providing vehicle roll control using dampers with controllable friction force is merely exemplary in nature, and is in no way intended to limit the invention or its applications or uses.

Figure 1:
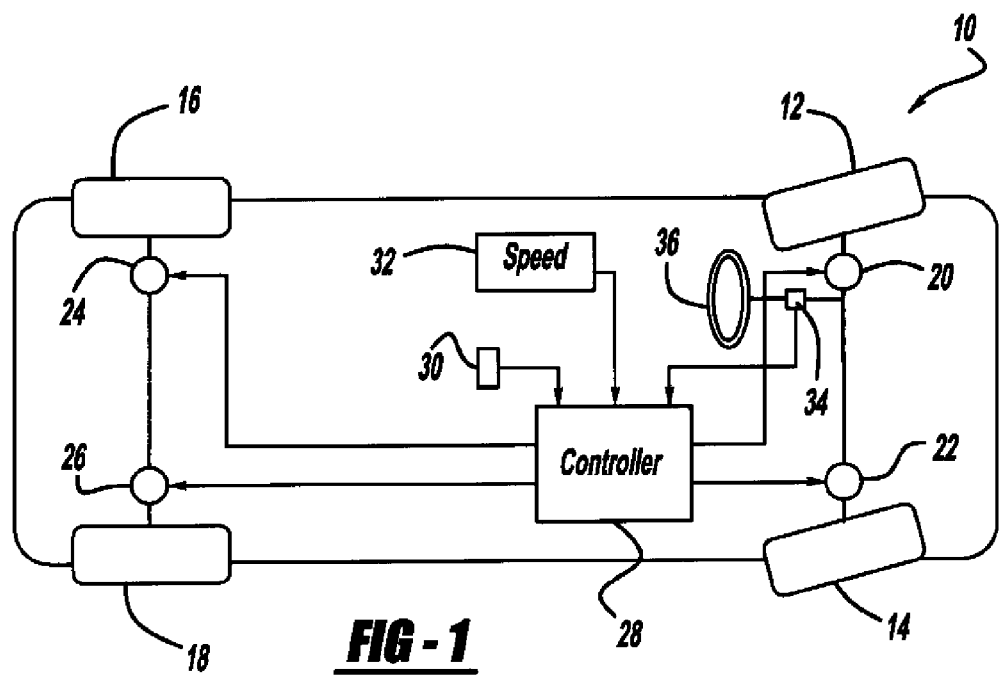
FIG. 1 is a plan view of a vehicle including a vehicle roll controller and dampers with controllable friction force, according to an embodiment of the present invention.

FIG. 1 is a plan view of a vehicle 10 including front wheels 12 and 14 and rear wheels 16 and 18. The front wheel 12 is connected to a damper with controllable friction force 20, the front wheel 14 is connected to a damper with controllable friction force 22, the rear wheel 16 is connected to a damper with controllable friction force 24 and the rear wheel 18 is connected to a damper with controllable friction force 26 that provide vehicle damping for ride stability. Dampers with controllable friction force are well known to those skilled in the art for providing vehicle ride and comfort at each of the wheels of a vehicle. The vehicle 10 also includes a controller 28 that provides vehicle roll control signals to the dampers 20, 22, 24 and 26 to prevent or reduce vehicle roll during a turn, as will be discussed in detail below.

Figure 2:
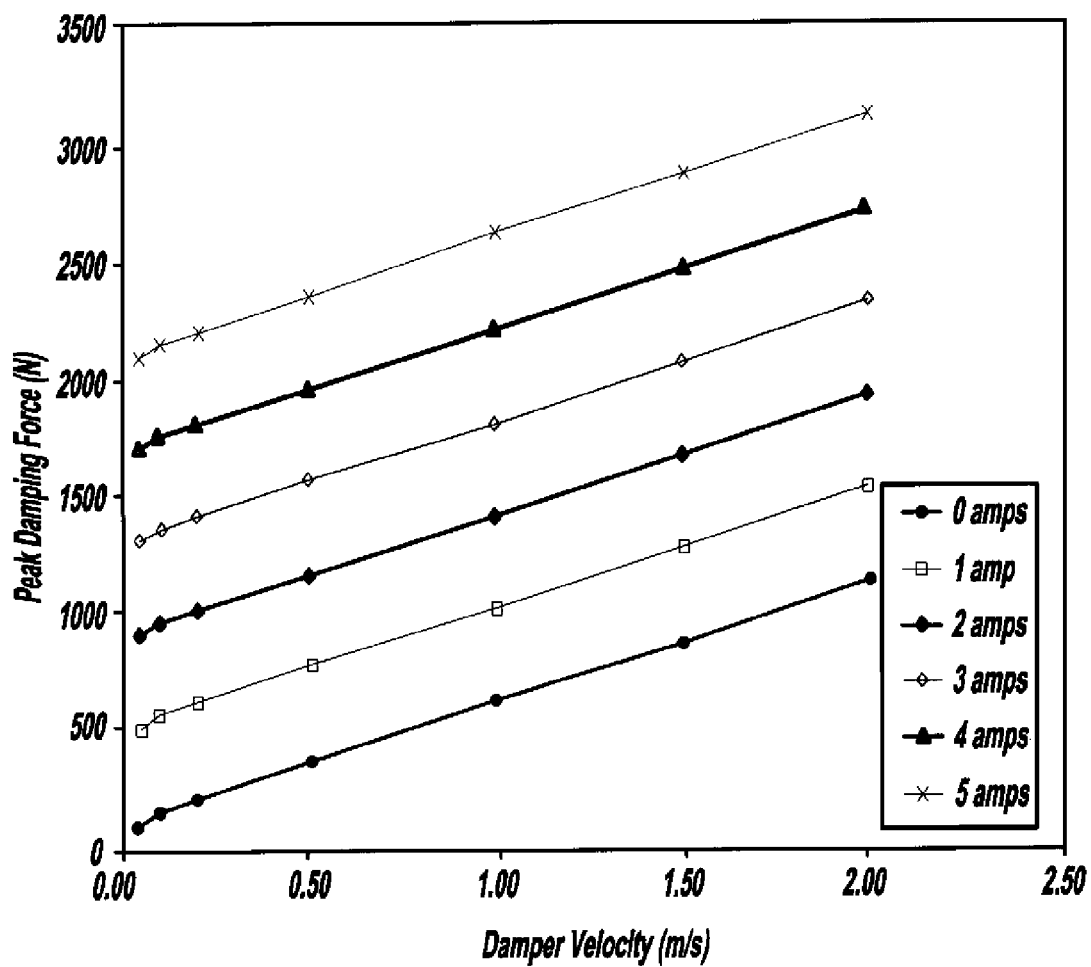
FIG. 2 is a graph with damper velocity on the horizontal axis and peak damping force on the vertical axis showing a force characteristic of a typical damper with controllable friction force.

The dampers 20, 22, 24 and 26 can be any damper with controllable friction force suitable for the purposes described herein, such as electrorheological (ER) and magnetorheological (MR) type dampers that can control their friction force including Coulomb friction. FIG. 2 is a graph with damper velocity on the horizontal axis and peak damping force on the vertical axis showing a force characteristic of a typical damper with controllable friction force. These types of dampers include fluids whose viscosity and/or yield stress changes in response to an electrical voltage or current. The fluids in ER and MR dampers typically include magnetizable particles suspended in an inert base fluid to provide the viscosity change. ER and MR dampers of this type are well understood to those skilled in the art. One suitable non-limiting example of such a damper for the present invention can be found in U.S. Patent Application Publication 2005/0121269, titled Fluid Damper Having Continuously Variable Damping Response, published Jun. 9, 2005.

The controller 28 receives various inputs to provide the proper current control signal to the dampers 20, 22, 24 and 26 for roll control. Particularly, the controller 28 receives a lateral acceleration signal $a_y$ from a lateral accelerometer 30 indicative of the lateral acceleration of the vehicle 10, a vehicle speed signal v from a vehicle speed sensor 32 and a hand-wheel angle signal $\delta$ from a hand-wheel angle sensor 34 providing a steering angle of the vehicle 10 in response to turning of the vehicle hand-wheel 36.

Figure 3:
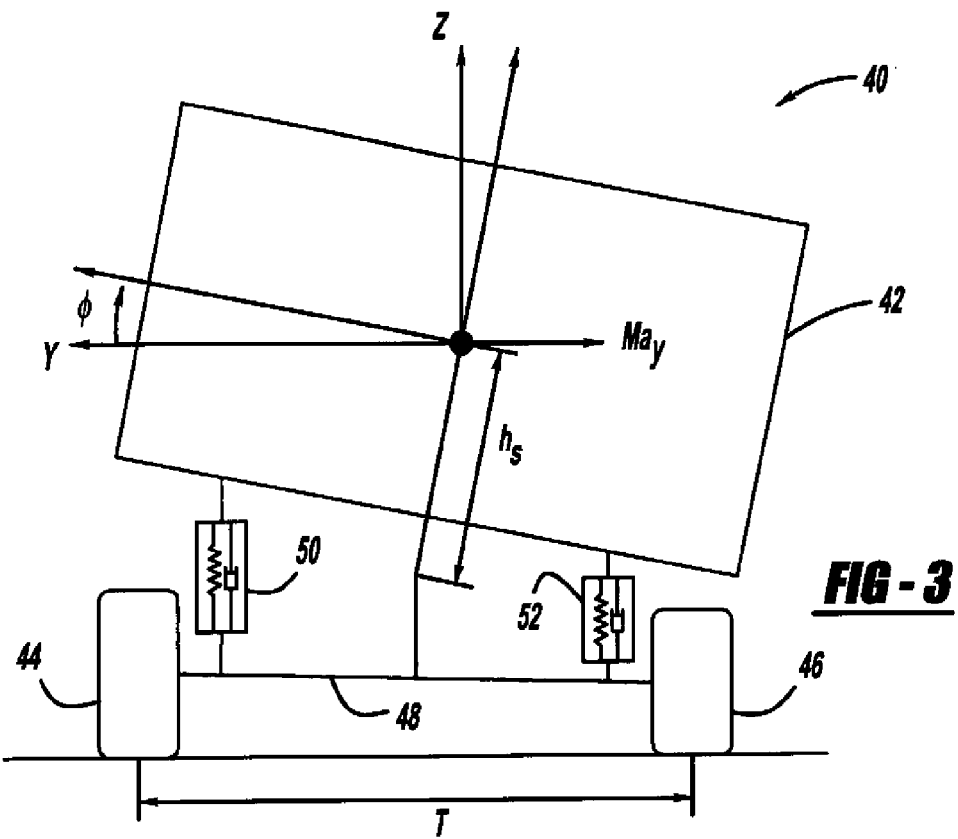
FIG. 3 is a plan view of a vehicle showing parameters that go into a roll motion of a vehicle.

FIG. 3 is a schematic diagram showing a rear-view of a vehicle 40 including a vehicle body 42 under a roll motion. A left rear wheel 44 and a right rear wheel 46 are coupled to an axle 48 of the vehicle 40. A damper with controllable friction force 50 of the type discussed above is provided at the rear wheel 44 and a damper with controllable friction force 52 is provided at the rear wheel 46. When the vehicle body 42 is in a roll motion, defined by $\phi$, the suspension on each side of the vehicle 40 is either compressed or extended depending on the roll direction causing the dampers 50 and 52 to deflect.

Vehicle roll motion can be modeled as a one degree-of-freedom dynamic model as:

$$(I_{xx}+M_s h_s^2)\ddot{\phi}+b_r\dot{\phi}+k_r\phi=M_s h_s a_{y,m} \qquad (1)$$

Where $I_{xx}$ is the roll moment of inertia of the vehicle body (sprung mass) with respect to the center of gravity, $M_s$ is the mass of vehicle body, $h_s$ is the height of the center of gravity from the roll center, $b_r$ and $k_r$ are the roll damping coefficient and the roll stiffness, respectively, and are combined values for a suspension and tire, and $a_{y,m}$ is the measured lateral acceleration, which includes the gravity component due to vehicle roll as well as the true lateral acceleration of the vehicle 10.

When the vehicle 10 is turning, a roll motion is induced on the vehicle 10 which causes the inside of the vehicle body to extend and the outside of the vehicle body to compress. In order to eliminate or reduce this roll motion, the present invention proposes providing a current control signal to the dampers on the inside or outside of the roll motion, or both, to prevent the vehicle 10 from rolling. The roll motion is either detected by the turning radius of the vehicle from the sensor 34 or by the lateral acceleration of the vehicle 10 from the sensor 30. As will be discussed in detail below, the current control signal applied to the particular damper 20, 22, 24 and/or 26 is calculated based on both of these variables. When the current control signal is calculated based on the steering angle, a gain value is determined for the signal using lateral acceleration from the model of equation (1).

For relatively small roll motion, the current control signals applied to the dampers 20, 22, 24 and/or 26 can completely eliminate the roll motion. As the roll motion increases beyond a certain limit based on the vehicle speed and the turning harshness, the limits of the dampers 20, 22, 24 and/or 26 may only be able to partially reduce the amount of roll.

When determining the current control signal for the right or left side of the vehicle 10 to prevent or reduce vehicle roll, a different current control signal may be applied to the front and rear damper, and may be based on vehicle weight.

Figure 4:
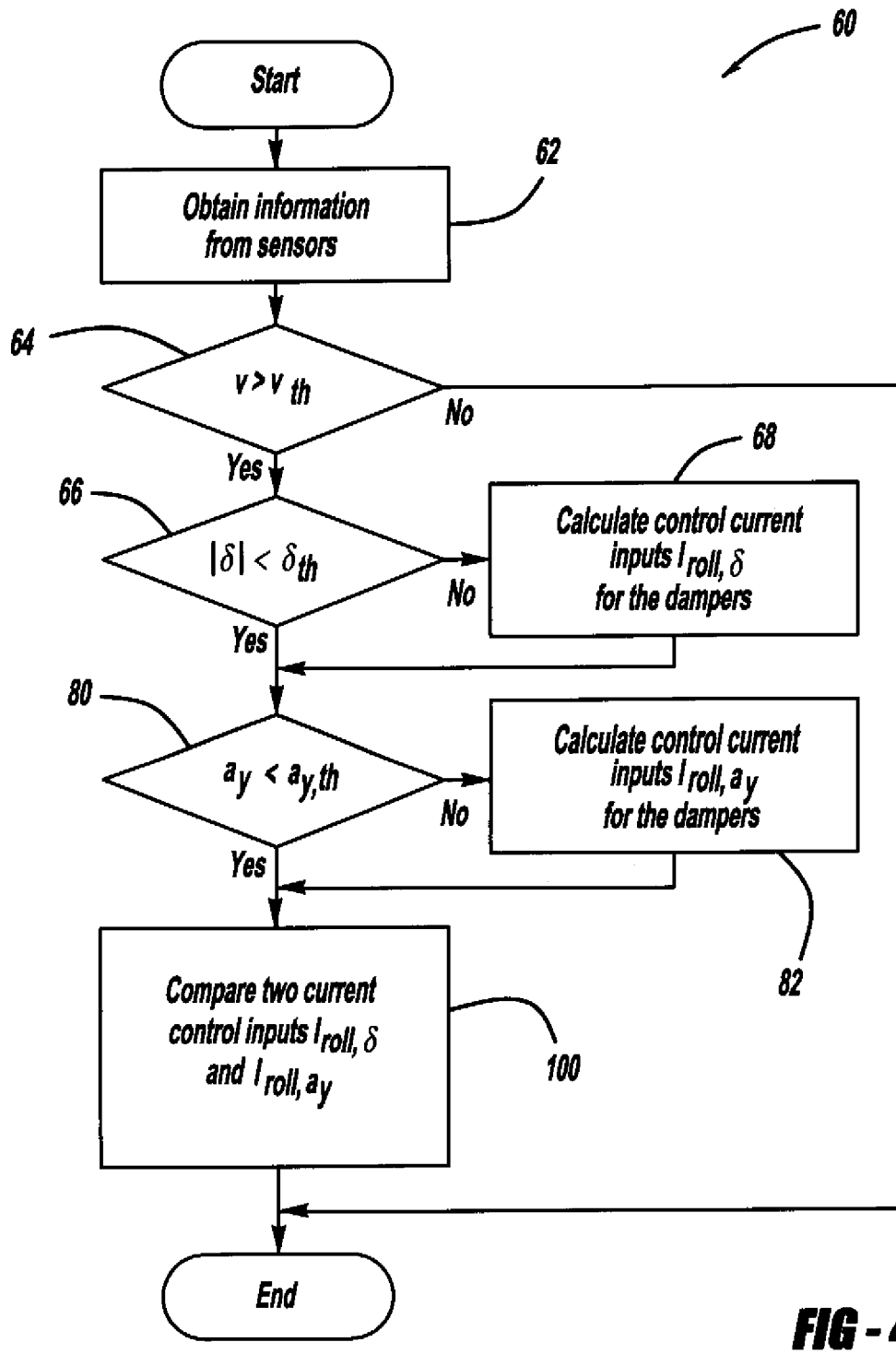
FIG. 4 is a flow chart diagram showing a process for calculating the current provided to one or more of the dampers with controllable friction force to provide roll control, according to an embodiment of the present invention.

FIG. 4 is a flow chart diagram showing a process for determining the current control signal $I_{roll,\delta}$ a for the dampers 20, 22, 24 and 26 based on the steering angle and the current control signal $I_{roll,ay}$ for the dampers 20, 22, 24 and/or 26 based on lateral acceleration. The algorithm that determines the current control signals first obtains the sensor information at box 62, particularly the vehicle speed signal v from the sensor 32, the lateral acceleration signal $a_y$ from the sensor 30 and the hand-wheel angle signal $\delta$ from the sensor 34. The algorithm then determines whether the vehicle speed signal v is greater than a predetermined threshold $v_{th}$ at decision diamond 64. The controller 28 does not provide the current control signals to the dampers 20, 22, 24 and/or 26 unless the vehicle 10 is traveling above a predetermined speed.

If the vehicle 10 is not traveling above that speed, then the process ends. If the vehicle speed signal v is greater than the threshold $v_{th}$ at the decision diamond 64, then the algorithm determines whether the absolute value of the hand-wheel angle signal $\delta$ from the sensor 34 is less than a predetermined threshold $\delta_{th}$ at decision diamond 66. The hand-wheel angle signal $\delta$ will be either positive or negative depending on which direction the hand wheel 36 is rotated. If the absolute value of the hand-wheel angle signal $\delta$ is less than the threshold $\delta_{th}$, then the algorithm proceeds. If the hand-wheel angle signal $\delta$ is greater than the threshold $\delta_{th}$ at the decision diamond 66, the algorithm calculates the current control signal $I_{roll,\delta}$ for the dampers 20, 22, 24 and 26 at box 68.

Figure 5:
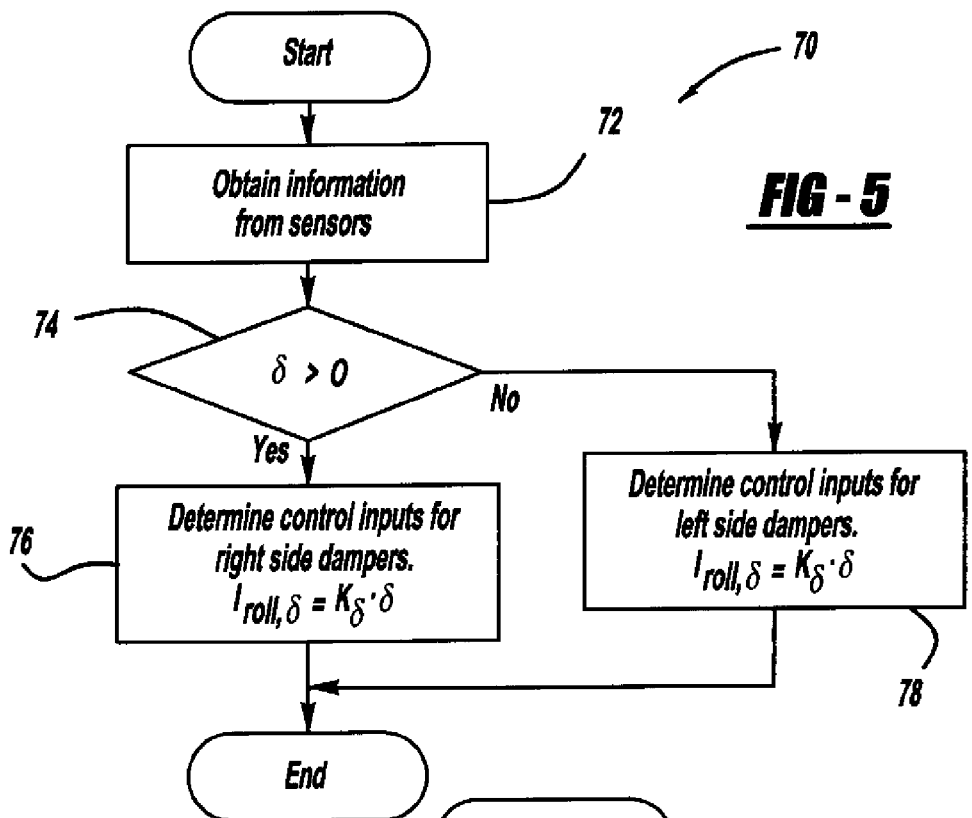
FIG. 5 is a flow chart diagram showing a method for determining a current control signal for the dampers with controllable friction force based on steering angle.

FIG. 5 is a flow chart diagram 70 showing the process for calculating the current control signal $I_{roll,\delta}$ according to one non-limiting embodiment of the present invention. The algorithm obtains the information from the sensors 30, 32 and 34 as discussed above at box 72. The algorithm then determines whether the hand-wheel angle signal $\delta$ is greater than zero at decision diamond 74 to determine whether the hand-wheel 36 is turning in the right or left direction. If the hand-wheel angle signal $\delta$ is greater than zero at the decision diamond 74, then the vehicle 10 is turning right and the controller 28 calculates the current control signal $I_{roll,\delta}$ for the right side dampers, particularly the dampers 22 and 26, at box 76. If the hand-wheel angle signal $\delta$ is not greater than zero at the decision diamond 74, then the vehicle is turning left and the controller 28 calculates the current control signal $I_{roll,\delta}$ for the left side dampers, particularly the dampers 20 and 24, at box 78.

In other embodiments, if the hand-wheel angle signal $\delta$ is greater than zero at the decision diamond 74, then the controller 28 may calculate the current control signal $I_{roll,\delta}$ for the left side dampers 20 and 24 at the box 76 or all of the dampers 20, 22, 24 and 26 on both sides at the box 76. Similarly, in other embodiments, if the hand-wheel angle signal $\delta$ is not greater than zero at the decision diamond 74, then the controller 28 may calculate the current control signal $I_{roll,\delta}$ for the right side dampers 22 and 26 at the box 76 or all of the dampers 20, 22, 24 and 26 on both sides at the box 76.

In one non-limiting embodiment, the current control signal $I_{roll,\delta}$ applied to the dampers 20, 22, 24 and/or 26 is determined based on the steering angle as:

$$I_{roll,\delta}=K_\delta \cdot |\delta| \qquad (2)$$

Where $K_\delta$ is a vehicle dependent gain that can be calculated based on the one degree-of-freedom vehicle model shown in equation (1) and the lateral acceleration gain.

When using the lateral acceleration gain concept, which is well known to those skilled in the art, the lateral acceleration signal $a_y$ can be calculated as:

$$a_y = \frac{V^2}{L+K_{US}V^2}\delta \qquad (3)$$

Where V is the vehicle speed, L is the vehicle wheel-base and $K_{US}$ is the understeer gradient. The current control signal $I_{roll,\delta}$ needs to be proportional to the lateral acceleration because the vehicle roll is induced by lateral acceleration, as shown in equation (1). Therefore, the gain $K_\delta$ in equation (2) can be calculated as:

$$K_\delta = C_{K\delta}\frac{V^2}{L+K_{US}V^2} \qquad (4)$$

Where $C_{K\delta}$ is a vehicle dependent parameter and may vary with vehicle speed, roll angle and steering wheel angle.

Returning to FIG. 4, the algorithm determines whether the absolute value of the lateral acceleration signal $a_y$ is less than a predetermined threshold $a_{y,th}$ at decision diamond 80. If the lateral acceleration signal $a_y$ is less than the threshold $a_{y,th}$, then the algorithm does not calculate the current control signal $I_{roll,ay}$ for the dampers 20, 22, 24 and/or 26 based on the lateral acceleration. If the absolute value of the lateral acceleration signal $a_y$ is not less than the threshold $a_{y,th}$, at the decision diamond 80, then the algorithm calculates the current control signal $I_{roll,ay}$ for the dampers 20, 22, 24 and/or 26 at box 82.

The current control signal $I_{roll,ay}$ needs to be proportional to lateral acceleration because vehicle roll is induced by lateral acceleration, as shown in equation (1). The current control signal $I_{roll,ay}$ can be determined based on the lateral acceleration from equation (5) below.

$$I_{roll,ay} = K_{ay} |a_y| \quad (5)$$

When using the lateral acceleration signal to determine the current control signal $I_{roll,ay}$, the gain $K_{ay}$ is a predetermined value available from look-up tables, and may vary with vehicle speed, roll angle and steering wheel angle.

Figure 6:
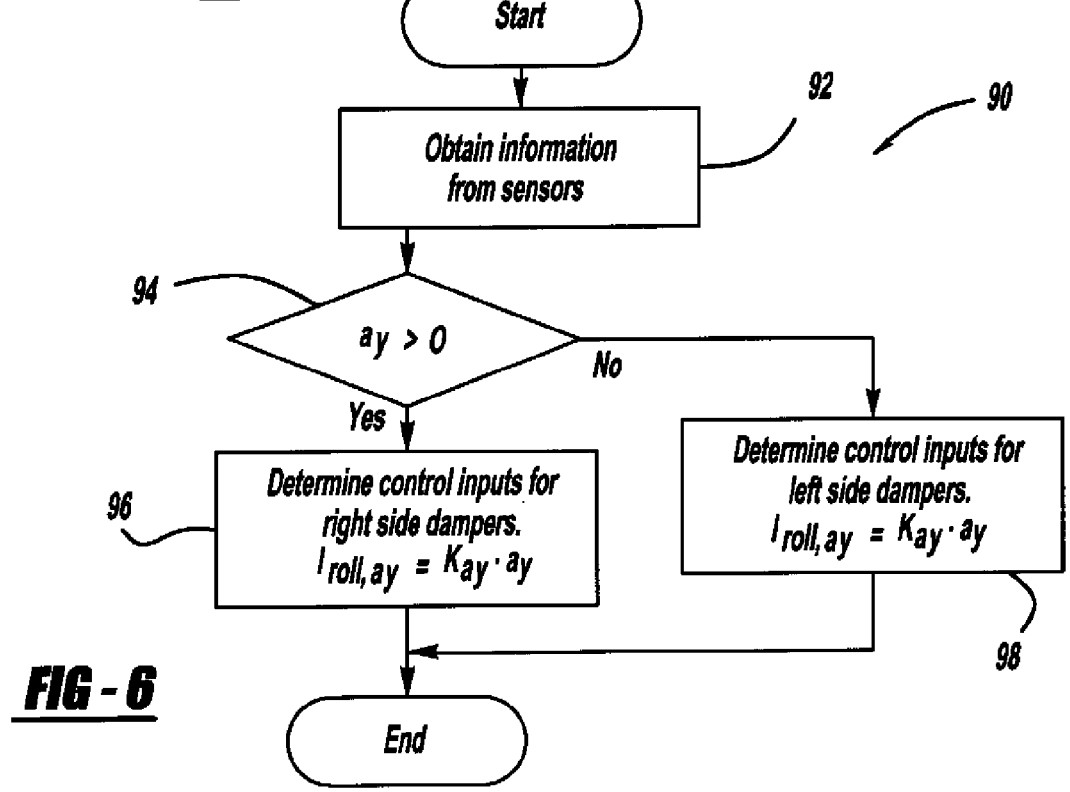
FIG. 6 is a flow chart diagram showing a method for determining a current control signal for the dampers with controllable friction force based on vehicle lateral acceleration.

FIG. 6 is a flow chart diagram 90 that determines the current control signal $I_{roll,ay}$ in the same manner as the current control signal $I_{roll,\delta}$. Particularly, in one embodiment, the algorithm obtains sensor information at box 92, determines whether the lateral acceleration signal $a_y$ is positive or negative (left or right) at decision diamond 94, calculates the current control signal $I_{roll,ay}$ for the right side dampers 22 and 26 at box 96 and calculates the current control signal $I_{roll,ay}$ for the left side dampers 20 and 24 at box 98.

In another embodiment, the algorithm obtains sensor information at the box 92, determines whether the lateral acceleration signal is positive or negative (left or right) at the decision diamond 94, and calculates the current control signal $I_{roll,ay}$ for the dampers 20, 22, 24 and 26 at both sides of the vehicle 10.

Returning to FIG. 4, the algorithm compares the current control signals $I_{roll,\delta}$ and $I_{roll,ay}$ at box 100. In one embodiment, the controller 28 uses the maximum of the two current control signals for the control. However, in other embodiments, the controller 28 may take an average of the two current control signals, add the two control current signals, or provide some other function to determine the applied current control signal.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A roll control system for a vehicle, said system comprising:
a lateral acceleration sensor for determining the lateral acceleration of the vehicle and providing a lateral acceleration signal;
a speed sensor for determining the speed of the vehicle and providing a vehicle speed signal;
a sensor for measuring a steering angle of the vehicle and providing a steering angle signal;
a damper with controllable friction force provided at each wheel of the vehicle; and
a controller for reducing the roll motion of the vehicle when it is turning by controlling the friction response of one or more of the wheel dampers, said controller receiving the lateral acceleration signal, the vehicle speed signal and the steering angle signal, and calculating a friction control signal that includes calculating a first current control signal based on the lateral acceleration signal and a second current control signal based on the steering angle signal, wherein the controller models the roll motion of the vehicle as a one degree-of-freedom dynamic model.

2. The system according to claim 1 wherein the dampers with controllable friction force are magnetorheological dampers or electrorheological dampers.

3. The system according to claim 1 wherein the controller uses the maximum of the first and second current control signals to provide the control signal to the dampers.

4. The system according to claim 1 wherein the controller provides the friction control signal to a damper at a front wheel and a rear wheel on an inside of the vehicle relative to a turn or to a damper at a front wheel and a rear wheel at an outside of the vehicle relative to the turn or both.

5. The system according to claim 1 wherein the controller provides different control signals to dampers at the front and rear wheels of the vehicle depending on the weight distribution in the vehicle.

6. The system according to claim 1 wherein the controller calculates the friction control signal based on the lateral acceleration signal using the equation:

$$I_{roll,ay} = K_{ay} \cdot |a_y|$$

Where $I_{roll,ay}$ is the control signal, $K_{ay}$ is a gain and $a_y$ is the lateral acceleration signal.

7. The system according to claim 1 wherein the controller determines the friction control signal based on the steering angle signal using the equation:

$$I_{roll,\delta} = K_\delta \cdot |\delta|$$

Where $I_{roll,\delta}$ is the friction control signal, $K_\delta$ is a gain value and $\delta$ is the steering angle signal.

8. The system according to claim 7 wherein the gain value $K_\delta$ is determined by lateral acceleration and a one degree-of-freedom model using the equation:

$$K_\delta = C_{K\delta} \frac{V^2}{L + K_{US} V^2}$$

Where $C_{K\delta}$ is a vehicle dependent parameter, V is the vehicle speed, L is the vehicle wheel-base, and $K_{US}$ is an understeer gradient.

9. A roll control system for a vehicle, said system comprising:
a damper with controllable friction force provided at each wheel of the vehicle, said dampers being used for vehicle ride purposes; and
a controller for selectively providing a current control signal to one or more of the dampers with controllable friction force in response to lateral acceleration of the vehicle so as to reduce the roll motion of the vehicle wherein the controller uses a vehicle lateral acceleration signal for determining the current control signal for the dampers, wherein the controller uses a steering angle signal of the vehicle in combination with a one degree-of-freedom model to determine the current control signal applied to the dampers, and wherein the controller provides the current control signal to a front and rear damper on an inside of the vehicle relative to a turn or to a front and rear damper on an outside of the vehicle relative to a turn.

10. The system according to claim 9 wherein the dampers with controllable friction force are magnetorheological dampers or electrorheological dampers.

11. The system according to claim 9 wherein the controller provides different control signals to the dampers at the front and rear wheels of the vehicle depending on the weight distribution in the vehicle.

12. A roll control system for a vehicle, said system comprising:
- a damper with controllable friction force provided at each wheel of the vehicle, said dampers being used for vehicle ride purposes; and
- a controller for selectively providing a current control signal to one or more of the dampers with controllable friction force in response to lateral acceleration of the vehicle so as to reduce the roll motion of the vehicle wherein the controller uses a vehicle lateral acceleration signal for determining the current control signal for the dampers, wherein the controller provides different control signals to the dampers at the front and rear wheels of the vehicle depending on the weight distribution in the vehicle.

* * * * *